United States Patent
Madden

(10) Patent No.: US 7,481,922 B2
(45) Date of Patent: Jan. 27, 2009

(54) FLUID TREATMENT APPARATUS

(76) Inventor: Edward Horton Madden, 22 Santa Domingo Ct., Odessa, TX (US) 79765

( * ) Notice: Subject to any disclaimer, the term of this patent is extended or adjusted under 35 U.S.C. 154(b) by 2 days.

(21) Appl. No.: 11/030,618

(22) Filed: Jan. 5, 2005

(65) Prior Publication Data

US 2006/0144795 A1 Jul. 6, 2006

Related U.S. Application Data

(60) Provisional application No. 60/534,648, filed on Jan. 5, 2004.

(51) Int. Cl.
C02F 1/461 (2006.01)

(52) U.S. Cl. .................... 210/192; 96/87; 123/1 R; 123/538; 204/248; 204/196.1; 204/293; 210/198.1; 210/205; 210/232

(58) Field of Classification Search .................. 210/192
See application file for complete search history.

(56) References Cited

U.S. PATENT DOCUMENTS

| | | |
|---|---|---|
| 3,448,034 A | 6/1969 | Craft et al. |
| 3,974,071 A | 8/1976 | Dunn et al. |
| 4,545,873 A | 10/1985 | Blake et al. |
| 4,606,828 A | 8/1986 | Wells |
| 4,610,783 A * | 9/1986 | Hudson .................. 210/167.11 |
| 4,713,159 A | 12/1987 | Truitt et al. |
| 4,715,325 A | 12/1987 | Walker |
| 4,789,031 A | 12/1988 | Walker |
| 4,820,422 A | 4/1989 | Spencer |
| 4,959,155 A * | 9/1990 | Gomez ........................ 210/687 |
| 5,006,214 A | 4/1991 | Burchnell et al. |
| 5,059,217 A | 10/1991 | Arroyo et al. |
| 5,204,006 A | 4/1993 | Santoli |
| 5,258,108 A | 11/1993 | Cassidy |
| 5,368,705 A | 11/1994 | Cassidy |
| 5,451,273 A | 9/1995 | Howard et al. |
| 5,470,462 A | 11/1995 | Gauger |
| 6,019,092 A * | 2/2000 | Gilligan ....................... 123/538 |
| 6,605,212 B2 * | 8/2003 | Marsden ................. 210/167.21 |
| 6,989,095 B2 * | 1/2006 | Melton et al. ............ 210/198.1 |

* cited by examiner

*Primary Examiner*—Peter A. Hruskoci
(74) *Attorney, Agent, or Firm*—Marcus L Bates

(57) ABSTRACT

Fluid treatment apparatus having an alloy disk assembly comprised of a plurality of disks, each prepared from the metal elements copper, zinc, nickel, silver, and tin, which individually exhibit great propensity for reducing scale formation in flow conduits; particularly when combined together to form the fluid treatment alloy disk assembly of this disclosure. The disk assembly is housed within a suitable enclosure having passageways arranged to effect countercurrent flow through a series of apertured disks. The close proximity of the counter-flowing streams within the alloy disk assembly provide unexpected advances in the art of fluid treatment.

12 Claims, 2 Drawing Sheets

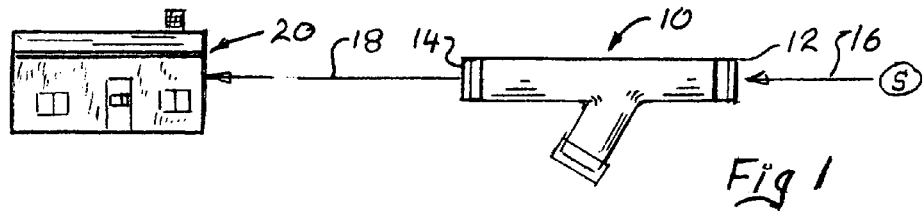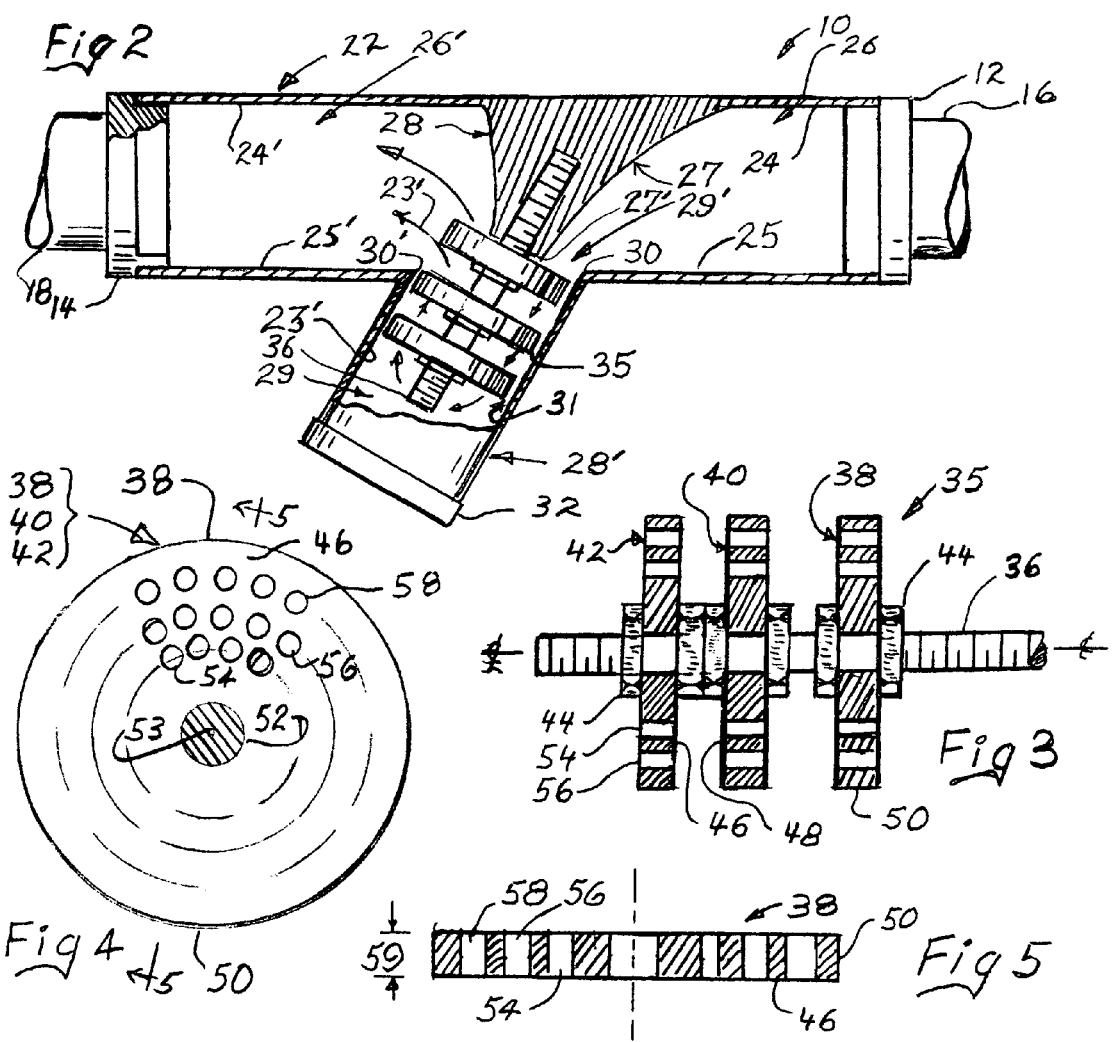

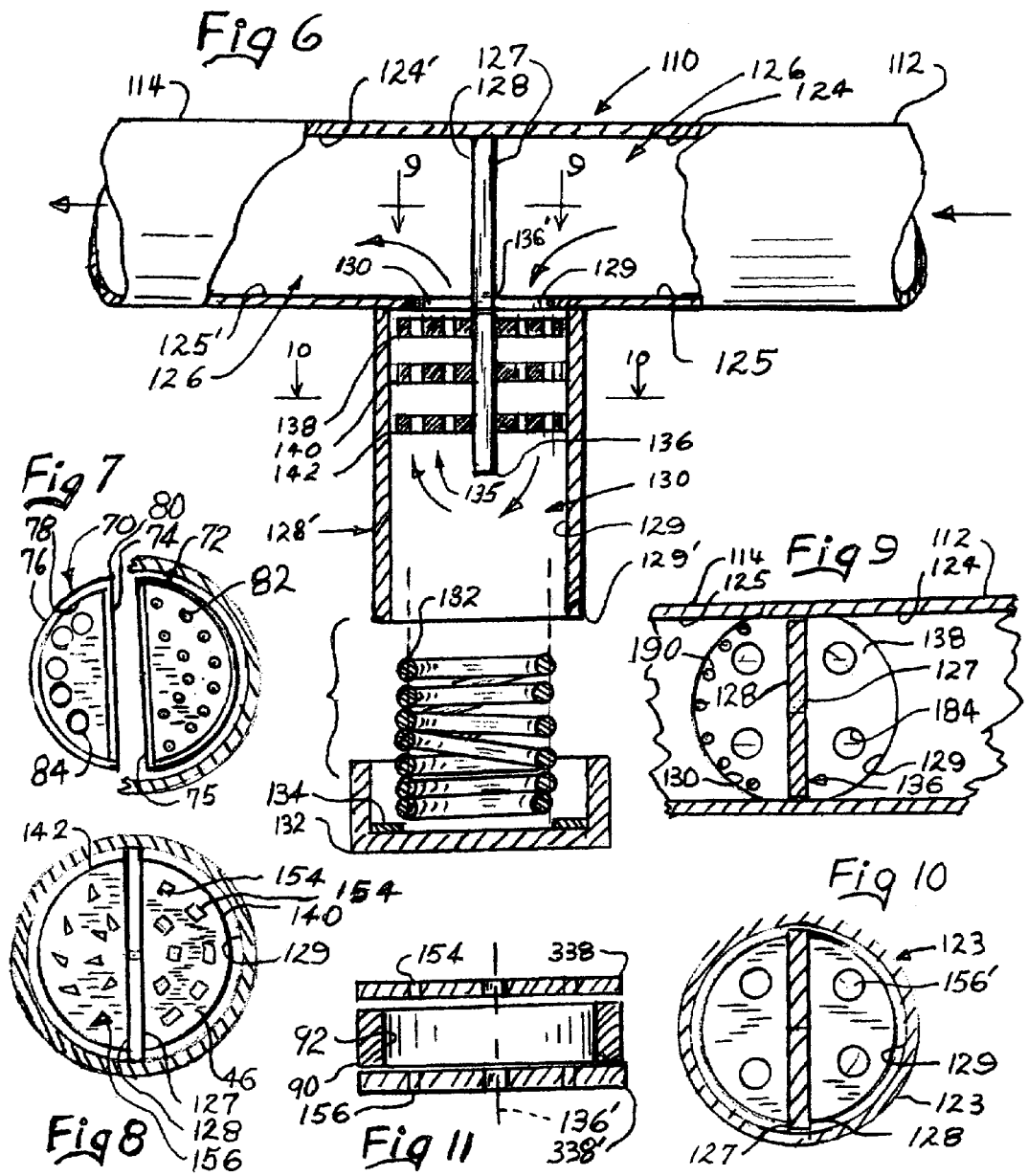

7,481,922 B2

FLUID TREATMENT APPARATUS

CROSS-REFERENCE TO RELATED APPLICATIONS

PROVISIONAL APPLICATION Ser. No. 06/534,648
APPLICANT: EDWARD HORTON MADDEN
FILED: Jan. 5, 2004
FOR: "FLUID TREATMENT METHOD AND APPARATUS"

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

This invention provides method and apparatus for treating a fluid by controllably flowing the fluid along a predetermined flow path which forces the fluid into intimate contact respective a special alloy, made in accordance with this invention, thereby advantageously treating the flowing fluid whereby the downstream fluid exhibits improved properties as a result of the recited interaction between the fluid and the alloy.

The alloy of this disclosure is prepared from the metal elements copper, zinc, nickel, silver, and tin. These individual metallic elements have been found to exhibit great propensity for reducing scale formation in flow conduits; particularly when all of the recited metal elements are combined together to form the alloy; and the alloy subsequently formed into the novel fluid treatment alloy disk assembly of this invention. This alloy is realized by elevating the temperature of the recited mixed metals until a predetermined eutectic point is achieved. The cooled resultant metal alloy provides the material from which the disk assembly is fabricated.

The resultant alloy is configured into geometrical bodies in accordance with the present invention as disclosed herein, and thereby provides a catalytic alloy disk assembly for treating flowing fluids in a new and novel manner. The term "fluid" as used herein is intended to include liquids and gases, as well as a mixture thereof, and hereinafter it will be deemed that the term "liquids" and "gases" are interchangeably included when appropriate to do so.

In accordance with this invention, the alloy disks of the disk assembly are housed within a suitable enclosure or container having an inlet and an outlet that facilitates fluid connection into a liquid or gaseous supply system in an arrangement that maximizes contact between the flowing fluid respective the alloy disk assembly of this invention.

Hence, there is novelty found in the alloy per se, in the configuration and composition of the alloy, and in the configuration of the combination of the alloy disk assembly and the enclosure therefor.

Accordingly the term liquid, water, and fluid, as used herein, are all considered to be improved when treated according to this disclosure, and includes treatment of various different liquids and gases such as, for example, water, hydrocarbons, crude oil, fuel oil, gasoline, natural gas, air, as well as various mixtures thereof.

Additionally, the present invention comprehends both method and apparatus related to all of these features of the invention as found in the various embodiments of this disclosure.

In the past, others have suggested various alloys, configurations of alloys, as well as alloy housing configurations. Accordingly, further background of this disclosure is incorporated herein by reference to the prior art disclosures set forth as follows:

U.S. Pat. No. 3,974,071 issued Aug. 10, 1976 to Dunn et al for a "Water Conditioning Device" by which corrosion and lime scale deposits are controlled by incorporation of a copper-nickel alloy apparatus within the cold water flow line to a beverage vending machine, for example.

U.S. Pat. No. 4,545,873 issued Oct. 8, 1985 to Blake et al to a vessel for an unstable solution of a metal salt or complex and method for sealing such vessel.

U.S. Pat. No. 4,606,828 issued Aug. 19, 1986 to Wells for a scale formation preventer and remover, including method and apparatus for removing calcium and other minerals from water flowing through a conduit having a reduced, rough textured cross-sectional area in an elongated core of a suitable alloy. The reduced cross-section area causes a desirable pressure drop in the flowing water.

U.S. Pat. No. 4,713,159 issued Dec. 15, 1987 to Truitt et al for a compact and cleanable apparatus for preventing scale formation in a liquid systems. The apparatus for eliminating mineral precipitation within a liquid (water) system includes a container with inlet and outlet pipes. A long treatment bar is attached within the inlet pipe in a removable manner to facilitate cleaning. The apparatus includes a brass extension means and the treatment bar is a metal alloy including copper, tin, iron, lead, zinc and nickel.

U.S. Pat. No. 4,715,325 issued Dec. 29, 1987 to Walker for pollution control through fuel treatment for use in an internal combustion engine. The fuel is treated by flowing in intimate contact with a crystalline metal alloy that includes specific percentages of copper, zinc, nickel, lead, tin, iron, antimony sulfur and manganese. According to the disclosure, flowing fuel through a housing thereof containing the metal alloy causes reduced pollution and increased mileage.

U.S. Pat. No. 4,789,031 issued Dec. 6, 1988 to Walker for a gas anchor and treating device. The gas anchor is attached to the end of a downhole pump located in a borehole having a metal rod located in a metal housing, both of which are made of a special metal alloy containing a specific percentage by weight of copper, zinc, nickel, lead, tin, iron, antimony, sulfur and manganese. Bottom hole fluid flowing through ports into contact with the housing and metal rod, then into the pump intake is treated by the action of the special alloy components, thereby causing significant reduction in scale and corrosion of the metal surfaces that come in contact with the produced fluid.

U.S. Pat. No. 4,820,422, issued Apr. 11, 1989 to Spenser comprehends a method for countering scale formation in fluid conduits. The system comprises a casing adapted for connection into a flow system, and a plurality of substantially spherical metallic members, preferably comprised of an alloy of copper zinc, nickel and tin, retained within the casing.

U.S. Pat. No. 5,006,214 issued Apr. 9, 1991 to Burchnell et al for a cathodic protection apparatus for copper water supply pipes includes a pipe section for installing into a water supply line. A sacrificial anode is supported on a rigid conductor and held axially aligned in the center of the pipe section by a pair of electrically conductive support brackets. An electrically conductive bolt passes through the pipe section and attaches an electrical ground conductor to the pipe section. Once connected into the water supply line, the copper pipes of a building are protected from corrosion due to electrolytic action.

U.S. Pat. No. 5,059,217 issued Oct. 22, 1991 to Arroyo et al for a fluid treating device for gasoline or diesel fuel for vehicles and comprising an elongated housing having fuel line connectors on each end. A central opening in the housing supports a metal bar formed of an alloy composition including copper, nickel, zinc, tin, magnesium and silicon. The fuel flows through the fuel line into the housing where it comes into contact with the metal bar and exits the second fuel line as treated fuel having improved characteristics, substantially free of pollutants.

U.S. Pat. No. 5,204,006 issued Apr. 20, 1993 to Santoli for a water conditioning apparatus for inhibiting scale formation in water containing devices comprised of a housing containing a sinusoidal shaped core, both of which are comprised of copper, tin, nickel, zinc and lead. The housing is also provided with an electrical ground connection in the form of a fitting and a copper cable attached to a terminal on the housing to dissipate any electrical buildup to the earth ground.

U.S. Pat. No. 5,258,108 issued Nov. 2, 1993 and U.S. Pat. No. 5,368,705 issued Nov. 29, 1994, both to Cassidy. These Cassidy's patents concern the conditioning of fluids, such as water, and/or fuel by inserting a housing containing an alloy core comprised of varying percentages of components such as: zinc, manganese, copper, a precious metal, silicon, molybdenum, titanium and tungsten into the fluid flow line. When applied in conditioning fuel, the alloy may be surrounded by one or more magnets to enhance operation. When applying the housing and alloy core in conditioning water, the apparatus can be electrically connected to an earth ground.

U.S. Pat. No. 5,451,273 issued Sep. 19, 1995 to Howard et al for a cast alloy article and method of making a fuel filter. The fuel filter is comprised of a fluted cylindrical alloy core made of varying percentages of cast copper, zinc, nickel and tin, in combination with a housing suitable for insertion into a fuel line of an internal combustion engine and improves the combustion characteristics and efficiency of a liquid fuel by removing impurities.

U.S. Pat. No. 5,470,462 issued Nov. 28, 1995 to Gauger for an apparatus for preventing scale formation in water systems, including a housing containing an internal member or bar, both comprised of an alloy metal comprised of specific percentages of 68% Copper, 11% Zinc, 10.5% Nickel, 10% Tin and 0.5% lead can be suitably inserted into a water flow line. Water flowing through the housing contacts both the interior wall of the housing and the external area of the internal bar and other flow barriers. This action, and an optional electrical ground wire, conditions and effects the flowing water sufficiently to prevent scale formation.

The patents to Craft et al U.S. Pat. No. 3,448,034 and to Craft U.S. Pat. No. 3,486,999 are also related to apparatus for preventing scale formation in water systems and are referred to in many of the before mentioned patents.

BRIEF SUMMARY OF THE INVENTION

This disclosure teaches a water treatment system having a novel metal alloy of a composition and configuration set forth herein, and the use of such an alloy within a special enclosure for treating fluids. The improved alloy used herein comprises a mixture of metallic compounds, each judiciously selected in accordance with the electro-negatives of selected chemical elements; and, the oxidation potentials of the elements listed in the electro-negativity Scale of the Electromotive Series. Applicant has discovered that such a catalytic alloy conditioner advantageously provides electrons to a flowing stream of water in a catalytic manner to remove electron deficiencies in the water. These properties enable electrochemical changes to occur that inhibit scale and corrosion formation, as well as dissolving existing scale and eliminating corrosion. The apparatus of this disclosure also increases the wetness and cleaning power of water, decreases the gaseous content of water, and further breaks down and leaches away excessive salts from soil. Further, the invention inhibits algae fungus and mildew growth.

Accordingly, a primary object of this invention is the provision of method and apparatus for subjecting a flowing liquid to an alloy having characteristics such that electron deficiencies of the liquid is reduced and thereby reduce scale formation.

Another object of this invention is the provision of method and apparatus for subjecting a flowing liquid to an alloy selected with high negative characteristics that affect the flowing liquid in such a manner that scale formation is reduced.

A still further object of this invention is the provision of an enclosure having passageways formed therein that diverts a flowing stream of fluid to flow in countercurrent relationship through apertures formed within a plurality of alloy disk-like bodies of selected electro-chemical properties such that the quality of the flowing fluid is improved when intimately contacted by the alloy.

Still another object of this invention is the provision of a flow system which includes an apparatus for subjecting a flowing liquid to an alloy water conditioner in such a manner that electrons are transferred into the liquid whereupon existing scale downstream of the alloy is dissolved.

An additional object of this invention is the provision of a fluid treatment apparatus for subjecting a flowing liquid to a catalytic alloy in such a manner that electrons are translocated from the alloy into the liquid thereby reducing electron deficiency of the liquid, and improving the quality of the liquid.

Another and still further object of this invention is the provision of method and apparatus for subjecting a flowing fluid to surfaces of a disk assembly made of a catalytic alloy having a propensity for losing electrons to the flowing fluid in such a manner that inhibition of scale formation is realized downstream of the apparatus.

In accordance with the forgoing objects of this invention is the provision of method and apparatus for improving the quality of a fluid by subjecting the flowing fluid to the electrochemical properties of the novel alloy disclosed herein in such a manner that the molecules of the fluid, when brought into close proximity of the alloy surface by countercurrent flow through a disk assembly made of the novel alloy, exhibit unexpected improvements in a new and improved manner.

Accordingly another object of this invention is the provision of method and apparatus for subjecting a fluid to the electro-chemical properties of a catalytic alloy disk assembly, made in accordance with this invention, disposed in the flowing stream that flows countercurrent respective perforations formed in the individual apertures of the disk assembly and thereby interacts with the metal alloy composition thereof in a manner to improve the quality of the fluid while reducing scale formation.

The metal alloy components of the disk assembly are:

| | | | |
|---|---|---|---|
| copper | 60% by weight | oz. per lb. | 9.6 |
| zinc | 17% | | 2.72 |
| nickel | 15% | | 2.40 |
| silver | 2% | | .32 |
| tin | 6% | | .96 |
| | | | 1.00 Lb. |

The above percent composition by weight should be within an approximate range +/−15 percent.

Additional objects of this invention will become evident to those skilled in the art as this disclosure is more fully digested.

BRIEF DESCRIPTION OF THE SEVERAL VIEWS OF THE DRAWINGS

FIG. 1 is a part schematical, part diagrammatical illustration of the present invention disclosing one of several intended uses thereof;

FIG. 2 is an enlarged part cross-sectional view of the preferred embodiment of the invention;

FIG. 3 is an enlarged part cross-sectional side view of part of the apparatus disclosed in FIG. 2;

FIG. 4 is an enlarged plan view of part of the apparatus disclosed in FIG. 3;

FIG. 5 is a cross-sectional view taken along line 5-5 of FIG. 4;

FIG. 6 is an enlarged, part cross-sectional, part schematical, part diagrammatical illustration of another embodiment of the present invention disclosing one of several modifications of the apparatus disclosed in FIGS. 2-5;

FIGS. 7, 8 and 11 are plan views of several modifications of part of the apparatus disclosed in FIG. 6; and;

FIGS. 9 and 10, respectively, are cross-sectional views taken along lines 9-9 and 10-10, respectively, of FIG. 6.

DETAILED DESCRIPTION OF THE INVENTION

FIG. 1 diagrammatically discloses a fluid treatment apparatus 10, made in accordance with this invention. The apparatus 10 is illustrated in the form of a housing or enclosure having an inlet end at adapter 12 opposed to an outlet end at adapter 14, whereby, flow of fluid that is to be treated is received from a suitable source S, where it is conducted along flow line 16 and enters inlet end 12 of apparatus 10 for treatment thereof as the fluid flows therethrough. The outlet end 14 of fluid treatment apparatus 10 is connected to a suitable flow line 18 which conveys the treated fluid to a facility 20. Facility 20 can take on any number of different forms that uses the treated fluid, such as, for example, a home, a business, a factory, or the like.

As illustrated in FIG. 2, together with other Figures of the drawings, the novel fluid treatment apparatus 10 is in the form of a main enclosure 22 through which the fluid flows along a meandering path while being subjected to treatment by being forced into intimate contact respective a catalytic alloy assembly 35 (FIG. 3) suspended to be uniquely placed in the flow path for countercurrent flow therethrough, the details of which are more fully described later on herein.

The outer surface of main enclosure 22 and inner surfaces 24, 25 of treatment apparatus 10 form the illustrated inlet passageway 26 and outlet passageway 26' that preferably is cylindrical in form and divided by diverter 27, 28 into the upstream and downstream passageways 26, 26'. Concave surface 27 diverts fluid flow along a path as indicated by numeral 29', whereby flow from inlet adapter 12 is forced into treatment chamber 29 which is arranged laterally or obliquely to form the illustrated angled hollow sump 23. The central axis of sump 23 preferably is disposed 120 degrees respective the central axis of passageway 26, 26'. Sump 23 can be arranged at angles other than 120 degrees respective the central axis of inlet and outlet passageways 26, 26', as may be desired, in order to efficiently enhance the countercurrent flow of fluid through the alloy disk assembly 35 of this invention.

The interior 23' of sump 23 forms the before mentioned treatment chamber 29 which is disclosed in the form of a hollow blind passageway or sump, having a closure member 32 removably attached to the depending or free end thereof, with a resilient seal (not shown) included. A fluid treatment alloy disk assembly 35 that forms the catalytic alloy fluid conditioner claimed herein is telescopingly received along the central axis of treatment chamber 29. Disk assembly 35, the details of which are set forth in FIG. 3, is securely mounted by the illustrated axial support member 36 as shown in FIG. 3, with the uppermost disk thereof abuttingly engaging face 27' of diverter 27, 28. The alloy disk assembly 35 is comprised of spaced apart, apertured metallic disks 38, 40, 42 arranged with the apertures 54, 56 thereof oriented about a predetermined common axis while the respective apertures of the disks are oriented along the same predetermined axis. However, in some instances it is preferred to misalign the adjacent confronting apertures 54, 56 of adjacent disks 38, 40, 42 where greater turbulence and elongated flow paths are desired, as will be more fully appreciated later on as this disclosure is more fully digested by those skilled in this art.

Still looking at the cross-sectional view seen in FIG. 3, a lock or fastener means 44, which can take on any desired form, abuttingly engages each side 46, 48 of each disk 38, 40, 42 and thereby removably secures each disk respective the axial support 36 which in turn is suitably affixed to and supported from the structure associated with the before mentioned diverter 27, 28. The support 36 is illustrated herein as an elongated rod having a threaded area along the surface thereof which forms a connection at each end thereof.

In the assembled configuration of FIG. 2, together with FIG. 3, the outer periphery of the spaced alloy disks 38, 40, 42 preferably have a small annular area formed relative the inner surface 23' of sump 23 to bring part of the fluid undergoing treatment into close proximity respective to the rim or outside diameter edge 50 of the alloy disk assembly 35, also appropriately noted as being an annulus 31.

In FIG. 4, together with other figures of the drawing, the central aperture 53 of a disk 38, 40, 42 receives axial support 36 therethrough for each of the disks. Additional apertures 54, 56, 58, respectively, are positioned in a circumferentially extending area that lays along spaced intervals from the central axis of support member 36. Therefore, these additional apertures are referenced as inner, middle, and outer circles of apertures. Each aperture is considered to be a flow path and is formed during the casting of the individual disk, or alternatively can be drilled using known procedures. Numeral 46 indicates one of the opposed faces of disk 38. Numeral 59 of FIG. 5 indicates one selected thickness of the disks which can be other than disclosed herein as may be desired.

Still looking at FIG. 2, it should be noted that the alloy assembly 35 is arranged for countercurrent flow therethrough whereby the untreated fluid, as indicated by numeral 29' exits the upstream chamber 26 at openings 30 which are aligned respective sump 23 to form an inlet (also indicated by the arrow at numeral 29') where fluid is forced to flow through the apertures aligned in underlying relationship respective the flow path seen between curved surface 27 of the diverter and the opening extending from 30 to 30' outlet 28',and a downstream concave face 28. The upper disk together with the diverter and sump walls therefore induce fluid flow in countercurrent relationship relative to the alloy disk assembly which enhances the efficiency of treatment apparatus 10.

Looking now to the liquid conditioner 110 seen in the embodiment of FIG. 6, together with FIGS. 7-11, there is illustrated a second preferred embodiment of the invention, wherein like or similar numerals refer to like or similar corresponding parts previously mentioned in conjunction with the foregoing Figures.

The alloy disk assembly 135 is seen to incorporate pairs of a crescent half disk 70 for use in various embodiments of the invention.

In FIG. 6, numerals 127, 128 indicate opposed faces of a combination baffle and support having a lower end 136 depending therefrom while numeral 129 indicates the flow inlet directed into treatment chamber 130 which has been formed through a lower surface of interior wall 125, 126 of enclosure parts or surfaces 112 and 114.

Still looking at FIG. 6, numeral 132 indicates a compression spring that urges the various disks 138, 140, 142 into properly assembled relationship respective one another by urging the disks against one another and against the annular shoulder 129 that is formed by opening 129, 130 formed through the lower surface 125, 125' of passageway 126, 126' through which the lower end 136 of the diverter extends. It will be noted that the diverter member 127, 128 conforms to the inside configuration 124 of inlet passageway 126 and is reduced at 136' to form the marginal lower end thereof for fluid flow control and return flow from chamber 130 which is bisected by the diverter to form countercurrent flow passageways positioned on either side 127 and 128 of the lower part of diverter member 136. Hence, the plurality of apertured alloy disks of the alloy disk assembly 135 are maintained properly aligned by member 136 and thereby also provides for the desirable countercurrent flow of fluid respective the disk assembly.

Numerals 138, 140, 142 of FIG. 6 broadly illustrate one arrangement of the a disk assembly which is comprised of multiple pairs of the semi-circular disks illustrated in FIGS. 7-10; while numerals 338, 338' are alternate pairs of half or crescent shaped disks for use as one of the alloy disk assemblies enclosed within the sump 123.

In FIG. 7, each of the disk halves 70, 72 is provided, with lips 74, 75 that confront the faces 127, 128 of the diverter 136 which extends between adjacent vertical lip spacers 74, 75 of the two different confronting half moon or crescent shaped disk 70, 75 and are spaced from one another by the lower marginal end 136 of the diverter, with adjacent confronting edges 74, 75 bearing against opposed sides of the diverter lower end as seen in FIGS. 7 and 8.

Continuing with FIG. 7, note that a pair of half disk 70 is separated from an adjacent pair of disk by the provision of the illustrated upwardly extending lip 74, 76 that circumferentially extends thereabout and forms half the outer periphery thereof, with lip part 74 extending parallel to the disk diameter, actually more properly referred to as "the chord" of the disk. Hence the half moon disk 70 is in the form of a cup that can be mounted upwardly or downwardly opening as may be desired.

Another alternate form of a disk spacer is seen illustrated at crescent shaped disk 72 of FIG. 7 and disk 138' of FIG. 9, which uses multiple upstanding spaced parallel pins 82 as a spacer, while the example seen in FIG. 11 uses cylindrical spacers having inner and outer wall surfaces 90, 92 by which the disks 338 and 338' are mounted in spaced relationship respective one another.

Looking again now to FIG. 7, the straight edge lip 74, 75 of the crescent disks 70, 72 abuts opposed faces 127, 128 of the lower marginal length of the downwardly extending diverter member 136. Hence, the lip spacer of disks 70, 72 has an inner surface 78 and outer surface 76 that form an outer rim about the disk as seen illustrated at 74, 75, 76, and 78. Numeral 80 indicates the corner formed by the joinder of lip parts 74, 76. The various aperture configurations allow for different fluid flow characteristics through the disks.

FIGS. 8 and 10, together with other figures of the drawing, disclose other possible variations of the flow apertures 82, 84, 154, 156, 158, 184 formed through the disks.

IN OPERATION

In operation, the alloy disks of the disk assemblies of this invention are housed within a suitable container or enclosure having an inlet end and an outlet end that facilitates fluid connection into a liquid supply system in a manner to maximize contact between the flowing liquid and the alloy disk components of this disclosure in order to treat or neutralize various flowing liquids.

As previously noted, the term liquid includes but is not limited to water and other fluids, as for example hydrocarbons such as crude oil, fuel oil, gasoline, and various mixtures thereof. Contact of the flowing fluid with the alloy components disclosed herein treats, removes, or neutralizes certain undesirable properties of the various fluids flowing along the countercurrent path through the alloy assembly contained within the sump or treatment chamber of the disclosed flow system. The sump inlet preferably is angled toward the inlet adapter as disclosed in FIG. 2, with the apertures of the disks being of a number and size to effect minimum pressure drop across the entire apparatus 10 of this disclosure.

The frequency of opening the sump and cleaning the alloy assembly of accumulated undesirable matter is a measure of the efficiency of operation because the accumulated solids that precipitate from the flowing fluid is a measure of the conversion of undesirable chemical elements that the system has converted into insoluble particles. Hence, the more solids that result from the treatment is the result of the desirable catalytic action thereof.

The unexpected results attained with this novel fluid treatment apparatus is found in the alloy composition along with the unusual combination diverter and support 27, 28 which enable counter current flow to be achieved through the plurality of alloy disk of disk assembly 35. It should now be appreciated that untreated fluid flows from adapter inlet end 12 of FIG. 2, for example, where the direction of flow is diverted about 120 degrees by the concave diverter flow control surface at 27, whereby the flow path indicated by the arrow at numeral 29 (which also indicates the inlet into the alloy disk assembly housing 23) is aligned with disk apertures oriented towards inlet 29 and thereby forms a path of least resistance through the upstream half of the nearest disk apertures. The flow diminishes step-wise as portions of the total flow proceeds through each disk and cross over to the outlet or downstream side provided by the other half of each of the disks and progressively changes velocity on its journey towards the sump outlet or discharge 30', with the lowermost or last disk receiving a reduced flow therethrough compared to the first disk. The arrow at numeral 30' indicates the opposite or countercurrent flow path that achieves the unexpected high efficiency of contact between the fluid flow and the disk assembly and increases the effect derived from the alloy metal of the disk assembly. The treated water discharges into the downstream part of the passageway and exits the process at adapter outlet 14 where it provides treated water at flow line 18.

The conditioner also removes electrons from some negative ions, and also provides for a significant increase of electrons for the ions and colloids in the water solution, resulting in inhibition of undesirable oxidation reaction, and, avoiding rust or corrosion particles in colloidal suspension by providing them with negative charges.

| CATALOG OF PARTS | |
|---|---|
| 10 | water treatment apparatus |
| S | source of flowing fluid |
| 12 | inlet end adapter |
| 14 | outlet end adapter |
| 16 | flow line inlet pipe |
| 18 | flow line outlet pipe |
| 20 | facility--house, office, factory et cetera |
| 22 | enclosure or housing |
| 23 | angled blind leg forming a sump |
| 24 | upper inner surface of enclosure 22 |
| 25' | lower inner surface of enclosure 22 |
| 26 | inlet passageway of 22 |
| 26' | outlet passageway of 22 |
| 27 | inlet diverter |
| 28 | outlet diverter |
| 29' | flow path--diverted into sump inlet |
| 29 | inner surface of sump |
| 30 | treatment chamber for containing the alloy assembly |
| 30' | sump flow outlet |
| 31 | annulus |
| 32 and 132 | closure member |
| 35 | alloy disk assembly for fluid treatment |
| 36 | axial support member |
| 38, 40, 42 | disks of the alloy assembly |
| 44 | lock or fastener device |
| 46 | upper face of disk |
| 48 | lower face of disk |
| 50 | outer periphery of alloy disk |
| 52 | aperture of disk |
| 53 | central axis of a disk |
| 54, 56, 58 | respectively, are inner, middle, outer aperture circles |
| 59 | thickness of disk |
| 70 | crescent or half disk of second embodiment |
| 72 | crescent or half disk of another embodiment |
| 74, 75, 76 | lip spacer lies adjacent 127 or 128 |
| 76 | lip spacer forms outer rim |
| 78 | lip spacer forms inner rim |
| 80 | joinder of 74, 76 |
| 82 | small apertures |
| 84, 84' | aperture for fluid flow disk 70 |
| 90 | spacer id (FIG. 11) |
| 92 | spacer od |
| 123 | |
| 127, 128 | opposed faces of baffle plate support (FIGS. 6, 9 & 10) |
| 129 | inlet of sump |
| 129' | chamber interior wall |
| 130 | sump discharge |
| 132 | closure member |
| 132' | compression spring |
| 134 | seal resilient |
| 135 | disk assembly |
| 136 | axial support member for fluid treatment alloy disk assembly |
| 136' | Central axis (FIG. 11) |
| 138, 140, 142 | semi-circular disk assembly (FIG. 6) |
| 154, 156 | aperture for fluid flow (FIG. 11) |
| 158 | aperture (FIG. 9) |
| 190 | spacer pins (FIG. 9) |
| 238, 238' | half disks of the alloy conditioner 135 |

I claim:

1. Fluid treatment apparatus for conditioning a fluid flowing therethrough and thereby improving the properties thereof; said treatment apparatus comprising a hollow enclosure having an inlet end spaced from an outlet end with there being an internal flow passageway extending from said inlet end into communication respective said outlet end;

an opening formed between said inlet end and said outlet end; said enclosure further having a treatment chamber in the form of a hollow sump arranged laterally respective said inlet end and outlet end; said sump having an untreated fluid entrance end in communication respective said opening and spaced from a blind end with there being a closure member attached to and forming said blind end;

a diverter member affixed to an interior wall of said enclosure at a location that separates said inlet end from said outlet end; said diverter divides the opening into a sump entrance and a sump discharge whereby flow from the inlet end is diverted into the entrance to the sump and flow from the sump discharge is diverted from the sump into the outlet end;

an alloy disk assembly comprising a plurality of apertured spaced disks prepared from the metal elements copper, zinc, nickel, silver, and tin;

a disk mount extending from and affixed to said diverter member by which said plurality of alloy disks are mounted in spaced relationship within said sump; there being disk apertures aligned respective the sump entrance to form an inlet flow path through the disk apertures, and further including disk apertures aligned respective the sump discharge to form a treated discharge flow path from the sump into the outlet end; whereby, fluid flowing from said inlet end to said outlet end is forced to follow a path that extends from said inlet end towards said diverter which diverts the fluid flow into the sump entrance whereupon countercurrent flow is induced through the apertures of one side of the alloy disk assembly respective to the fluid returning from apertures located on the other side of the alloy disk assembly where the flow continues through the enclosure and to the outlet end thereof.

2. The apparatus of claim 1, wherein the sump is a hollow cylinder having an axial centerline that coincides with an axial centerline of the disk mount, with the apertures of the disks being arranged normal to the surface thereof and located in an area spaced from the outer periphery of the disks and the central axis of the disks; there being a first disk adjacent the diverter and a last disk adjacent the blind end of the sump.

3. The apparatus of claim 1, wherein the outer diameter of the disks are spaced from an interior wall surface of the sump to thereby form an annular area which allows fluid flow between the intervening space formed between the disks and the sump wall; said diverter has opposed concave surfaces which directs countercurrent flow towards the sump inlet and away from the sump discharge.

4. The apparatus of claim 1, wherein the apertures of adjacent disks are misaligned respective one another to enhance the contact between the fluid and the alloy disks; and further including spacers formed into the opposed faces of the disks to provide the desired spaced apart relationship of the adjacent disks, and said diverter has a downstream face for further diverting flow from the sump discharge towards the outlet end of the enclosure.

5. The apparatus of claim 1, wherein said fluid is a liquid; and said sump having a removable closure member to facilitate disassembly of the alloy disk assembly; the outer diameter of the disk assembly is spaced from the interior of the sump wall to thereby form an annular area which allows fluid flow therethrough; said diverter has opposed concave surfaces which direct flow respective the disk assembly.

6. The apparatus of claim 1, wherein said fluid is a liquid; said sump is a hollow cylinder having an axial centerline that coincides with an axial centerline of the disks; with the apertures of the disks being arranged normal to the surface thereof and located in an area spaced from the outer periphery of the disks and the central axis of the disks; wherein the outer diameter of the disks is spaced from the interior of the sump wall to thereby form an annular area which allows fluid flow between the intervening space formed between the disks and the sump wall.

7. Fluid treatment apparatus for improving the properties of a fluid flowing therethrough; comprising an enclosure having an inlet end spaced from an outlet end with there being an inlet and outlet flow passageway, extending from said inlet and outlet ends, respectively; said enclosure further having a hollow treatment chamber that forms a sump, with said sump being arranged laterally respective said inlet and outlet flow passageways; said sump having ends with one end being an entrance and the other end being closed by a closure member;

a diverter member affixed to the interior of said enclosure at a location intermediate said inlet and outlet ends for separating the inlet and outlet passageways, and for diverting flow from said inlet passageway into the sump entrance; and discharging fluid from said sump into said outlet flow passageway;

an alloy disk assembly comprising a plurality of apertured spaced alloy disks, said alloy disk assembly comprising a plurality of apertured spaced alloy disks having a weight percent of copper 60%, zinc 17%, nickel 15%, silver 2%, and tin 6%;

a disk mount extending from and affixed to said diverter by which said plurality of alloy disks are mounted in attached relationship respective the diverter and within said sump; the apertures of the disks being arranged respective the diverter to form a countercurrent fluid flow path from the sump entrance, through a first plurality of the apertures of the disks and return along a flow path formed through another plurality of disk apertures, and through the sump discharge into the outlet flow passageway; whereby, fluid flowing from said inlet end to said outlet end is forced to follow a flow path that extends from said inlet end to said diverter which diverts the fluid through a nearest portion of the apertures of the disk assembly, where the fluid flow path reverses and returns through the apertures of a furthest portion of the alloy disk assembly, and is diverted into the outlet end.

8. The apparatus of claim 7, wherein the fluid is a liquid, and the sump is a hollow cylinder having an axial centerline that coincides with an axial centerline of the disks; with the apertures of the disks being arranged in an area defined by the outer periphery of the disks and the central axis of the disks.

9. The apparatus of claim 7, wherein the fluid is a hydrocarbon, and the outer diameter of the disks is spaced from the interior of the sump wall to thereby allow fluid flow between the intervening space formed between the disks and the sump wall.

10. The apparatus of claim 7, wherein the apertures of the adjacent disk are misaligned respective one another to enhance the contact between the fluid and the alloy disks; and further including spacers formed into the opposed faces of the disks to provide the desired spaced apart relationship of the adjacent disks.

11. The apparatus of claim 7, wherein said fluid is water.

12. The apparatus of claim 7, wherein said fluid is a hydrocarbon; and wherein the sump is a hollow cylinder having an axial centerline that coincides with an axial centerline of the disk support; with the apertures of the disks being arranged normal to the surface thereof and located in an area spaced from the outer periphery of the disks and the central axis of the disks; there being a first disk adjacent the diverter and a last disk adjacent the sump closure member.

* * * * *